United States Patent

Kubota

[11] Patent Number: 5,001,512
[45] Date of Patent: Mar. 19, 1991

[54] EXPOSURE CONDITION SETTING METHOD FOR PHOTOGRAPHIC PRINTER

[75] Inventor: Kazufumi Kubota, Kanagawa, Japan

[73] Assignee: Fuji Photo Film Co., Tokyo, Japan

[21] Appl. No.: 452,024

[22] Filed: Dec. 18, 1989

[30] Foreign Application Priority Data

Dec. 26, 1988 [JP] Japan ................... 63-328375

[51] Int. Cl.$^5$ .............................................. G03B 27/80
[52] U.S. Cl. ......................................... 355/38; 355/77
[58] Field of Search ............................ 355/38, 68, 77; 356/404

[56] References Cited

U.S. PATENT DOCUMENTS 4,611,918 9/1986 Nishida et al. ................... 355/38 X
4,657,378 4/1987 Hope et al. ......................... 355/38

Primary Examiner—L. T. Hix
Assistant Examiner—D. Rutledge
Attorney, Agent, or Firm—Sughrue, Mion, Zinn, Macpeak & Seas

[57] ABSTRACT

In a method of setting exposure conditions for three colors in a photographic printer, a difference in density between a previously provided reference print and a test print made from a control negative without exposure correction is corrected, one color at a time, by making an exposure corrected by the use of an exposure correction value which is obtained one color at a time by multiplying the difference in density between the test print and the previously provided reference print by a predetermined correction coefficient. First to fifth test prints are made from a control negative in first to fifth different exposure conditions where corrections are effected for density in the first exposure condition, for density and all of yellow, magenta and cyan, in the second exposure condition, for density and each one of yellow, magenta and cyan in each of the third to fifth exposure conditions. Three color densities of the first test prints are detected and compared with those of the second to fifth test prints, respectively, to detect a ratio of change of density to exposure between the first test prints and each of the second to fifth control prints, thereby obtaining a correction coefficient, color by color.

3 Claims, 3 Drawing Sheets

FIG. 3

| PRINT No. \ Key | D | C | M | Y |
|---|---|---|---|---|
| 1 | -S | 0 | 0 | 0 |
| 2 | -S | +2S | +2S | +2S |
| 3 | -S | +2S | 0 | 0 |
| 4 | -S | 0 | +2S | 0 |
| 5 | -S | 0 | 0 | +2S |

FIG. 4

| PRINT No. \ Key | C | M | Y |
|---|---|---|---|
| 1 | -S | -S | -S |
| 2 | +S | +S | +S |
| 3 | +S | -S | -S |
| 4 | -S | +S | -S |
| 5 | -S | -S | +S |

EXPOSURE CONDITION SETTING METHOD FOR PHOTOGRAPHIC PRINTER

BACKGROUND OF THE INVENTION

The present invention relates to a method of setting a photographic printer to proper exposure conditions.

To set a photographic printer correctively according to changes in exposure property of the photographic printer itself, or according to a difference in color characteristics among color papers used for providing prints with a homogeneous image quality, the photographic printer is maintained daily to set proper exposure conditions. For exposure condition setting, correction keys or a normal key are used to change all, or any one, of the densities of three colors, such as yellow, magenta and cyan, so as to set different exposure conditions in which nine different test prints are made from a control negative. Three color densities of these test prints are measured and are compared with respective color densities of a reference print so as to detect a change in density for one step of correction key. An exposure correction value is determined so as to avoid a difference between the test and reference prints by the use of the change of density.

In such an exposure condition setting method, because of making test prints by using all of the density color correction keys to change exposures negatively or positively, the number of test prints becomes large.

SUMMARY OF THE INVENTION

One object of the present invention is to provide a method of setting exposure conditions of a photographic printer in which a decreased number of test prints is required.

This and other objects of the present invention are achieved by a method of setting exposure conditions for three colors in a photographic printer, in which a difference in density between a previously provided reference print and a test print made from a control negative without effecting any exposure correction by making an exposure is corrected by the use of an exposure correction value which is obtained, color by color, by multiplying the difference in density between the test print and the previously provided reference print by a predetermined correction coefficient. First to fifth test prints are made from a control negative under first to fifth different exposure conditions in which exposure corrections are effected by changing density in the first exposure condition, by changing density and all of the yellow, magenta and cyan densities in the second exposure condition, and by changing density and respective ones of yellow, magenta and cyan in each of the third to fifth exposure conditions. Three color densities of the first test print are compared with those of the second to fifth test prints, respectively, to detect a ratio of change of density to exposure between the first test print and each of the second to fifth test prints, thereby obtaining an exposure correction value by color.

Corrections of density and color are effected in a stepwise manner, either with or without operating correction keys, to increase or decrease the exposure by color. In this case, first to fifth test prints are made from a control negative in first to fifth different exposure conditions, where exposure corrections are effected by operating a density correction key to change density negatively by one step in the first exposure condition, by operating the density correction key to change density negatively by one step and color correction keys to change color positively by two steps for all of yellow, magenta and cyan in the second exposure condition, and by operating the density correction key to change density negatively by one step and each color correction key to change color positively by two steps in each of the third to fifth exposure conditions, respectively.

Upon setting up the photographic printer, five test prints are made from a control negative under the five different exposure conditions. The five test prints are measured to detect three color densities to obtain a ratio of the change of density relative to the change of exposure based on which an exposure correction coefficient is determined.

After the exposure correction coefficient has been determined by color, an exposure condition is set every time the photographic printer is maintained. In setting an exposure condition, a test print is made from the control negative without using the correction keys. The difference in density between the test print and the reference print is obtained, one color at a time, and an exposure correction value is determined by multiplying the difference by the exposure correction coefficient by color. Exposing the control negative by using the exposure correction values for the three colors makes a test print having the same density and color as the reference print.

BRIEF DESCRIPTION OF THE DRAWINGS

Still other objects of the invention and more specific features will become apparent to those skilled in the art from the following description of the preferred embodiment considered together with the accompanying drawings, wherein like reference characters have been used in the different figures to denote the same parts, and in which:

FIG. 3 is a correction key step table showing an exposure condition; and

FIG. 4 is a color correction key step table showing the exposure condition of FIG. 3.

DETAILED DESCRIPTION OF THE PREFERRED EMBODIMENT

Figure 1:
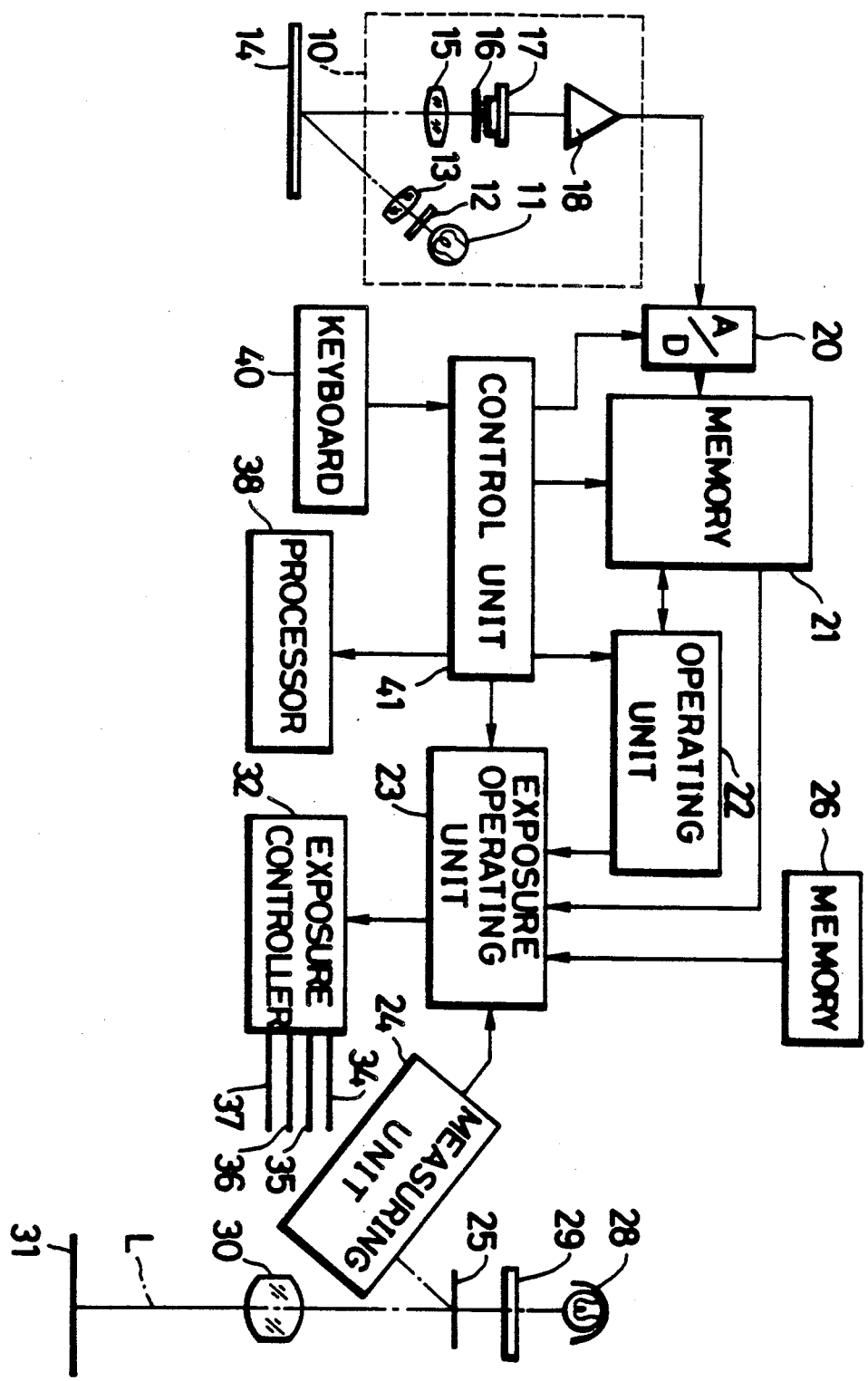
FIG. 1 is a schematic diagrammatic illustration of a photographic printer embodying the present invention.

Referring to the drawings in detail, particularly to FIG. 1, a photographic printer is provided with a densitometer 10 which consists of a lamp 11 and a photosensor 17. Light emanating from the lamp 11 and passing through a heat-absorbing filter 12 is focused in one spot on a reference or test print 14 by a lens 13. The light reflected by the reference print 14 is detected by means of a density measuring unit DU for measuring yellow, magenta and cyan densities of the reference print 14.

The density measuring unit DU basically consists of three color filters, blue, green and red, three photosensors, and three amplifiers for detecting densities of the reference print 14 for three colors: yellow, magenta and cyan. For example, the blue component of the light reflected by the reference print 14 is focused on the photosensor 17 by a lens 15 and a blue filter 16 to detect a density of the reference print 14 for yellow. An output from the photosensor 17 is logarithmically converted into a density signal, whose logarithmic magnitude is proportional to the density of the reference print 14, by means of a logarithmic transforming amplifier 18.

After being changed to digital form by means of an A/D converter 20, the three color density signals from the densitometer 10 are stored in a memory 21. Upon setting a standard condition, an operating unit 22 reads out three color density values for five different test prints to calculate a correction coefficient K which is used to alter a density difference for an exposure and write it in the memory 21. The correction coefficient K is expressed by the following matrix, with diagonal terms having large values:

$$K = \begin{bmatrix} Kcc & Kcm & Kcy \\ Kmc & Kmm & Kmy \\ Kyc & Kym & Kyy \end{bmatrix}$$

When conducting daily maintenance, a daily test print is made to calculate the density difference between the daily test print and reference print 14, color by color. An exposure correction value B is calculated from the density difference and correction coefficient, color by color, and then is stored in the memory 21. The exposure correction value B is a value necessary to make the daily print with the same color balance and density as those of the reference print 14. Letting P and $P_{ref}$ be color densities of the test print and the reference print, respectively, the exposure correction value B is as follows:

$$B = K (P_{ref} - P) \quad (1)$$

where the respective terms are given by the following matrices:

$$B = \begin{bmatrix} Bc \\ Bm \\ By \end{bmatrix}$$

$$Pref = \begin{bmatrix} Pref.c \\ Pref.m \\ Pref.y \end{bmatrix}$$

$$P = \begin{bmatrix} Pc \\ Pm \\ Py \end{bmatrix}$$

An exposure operating unit 23 calculates an exposure time T, color by color, from an exposure correction value B read out from the memory 21, a color density D of a negative film 25 provided by a light measuring unit 24, a three color density Dref of a control negative read out from a memory 26, and a coefficient C depending upon a magnification of print. The exposure time T is as follows:

$$\log T = D - Dref + B + C \quad (2)$$

where the respective terms are given by the following matrices:

$$T = \begin{bmatrix} Tc \\ Tm \\ Ty \end{bmatrix}$$

$$D = \begin{bmatrix} Dc \\ Dm \\ Dy \end{bmatrix}$$

$$Dref = \begin{bmatrix} Dref.c \\ Dref.m \\ Dref.y \end{bmatrix}$$

A printing exposure system, which may be of a well known type has a lamp 28 as a white light source. After being sufficiently diffused by a diffusing plate 29, the white light from the lamp 28 illuminates a negative film 25 from which prints are made. The light passing through the negative film 25 is focussed on a color paper 31 by means of a printing lens 30 so as to create a latent image in the color paper 31.

During the exposure of the color paper 31, an exposure controller 32 inserts a yellow filter 34 first into the printing light path L so as to shut down a blue light component of the white light. In a similar manner, magenta and cyan filters 35 and 36 are inserted into the printing light path L in order to shut down green and red light components of the white light. After shutting down the three color components of the white light, the exposure controller 32 inserts a shutter 37 into the printing light path L to terminate an exposure completely.

A processor 38, which may be of a well known type for performing photographic processing of an exposed color paper, consists of a developing section, a coloring and fixing section, a bleaching section, a drying section, and a cutting section. A keyboard 40 has various keys for inputting various instructions, such as a print key, an operation mode specifying key, step correction keys for yellow, magenta and cyan densities, and a measuring key. To increase the number of keys, numerical keys and instruction keys for specific corrections are used. The above noted units and elements are controlled by a control unit 41.

Figure 2:
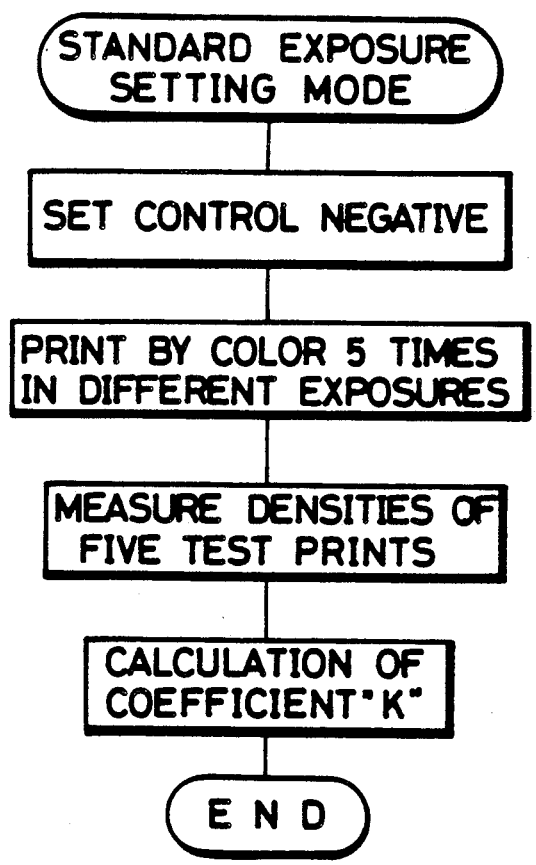
FIG. 2 is a flow chart of general sequence of obtaining a correction coefficient.

FIG. 2 shows a flow chart of exposure condition setting by use of reference prints and a control negative provided by the manufacturer of the printer. As was previously noted, the reference print has been made from the control negative under the most preferable exposure conditions. Upon setting up the printer after installation, loading a different type of color paper in the printer or replacing a part or parts of the printing exposure system with other parts or the like, the standard exposure condition is set to obtain an exposure correction value B. Because of the simple structure and function of the densitometer 10, the exposure correction value B is calculated so as to correct the scatter in densitometer lamp luminance between measurements, or the difference in property between color filters replaced by the use of the test print.

After selecting a standard exposure setting mode by operating the operation mode specifying key, a control negative 25 is placed in an exposure station of the printing exposure system, and then the print key is operated to make prints from the control negative 25. That is, when the print key is operated, the control unit 41 controls the exposure operating unit 23 to change an exposure in stepwise fashion so as to provide five different exposure conditions, as shown in FIG. 3, and to make exposures five times so as to provide five different prints (No. 1 to No. 5) from the control negative 25.

In FIG. 3, the symbols "S" refer to a number of correcting steps instructed by a step correction key. One correction step performs a correction of approximately 10% of a calculated exposure. For example, "−S" refers to an exposure decreased by one step or 10% of a calculated exposure, and "+2S" refers to an exposure increased by two steps or 20% of a calculated exposure. Zero (0) indicates that no exposure correction is made. For making density and color corrections by three color correction keys, the exposure conditions are indicated for five test prints as shown in FIG. 4. It is permitted, if required, to make more precise corrections of a few percent, for example 3%, of a step without using the step correction keys.

Upon making the five test prints, the control unit 41 controls the printer to make exposures under different printing conditions which are automatically changed so as to create five latent images of the control negative in the color paper 31 and to print test print numbers on the backs of the color paper 31. The exposed color paper 31 is processed by the photographic processor 38 and thereafter is cut into five individual test prints.

Thereafter, after operating the density measuring key to initiate density measurement, the five test prints are measured by the densitometer 10 in order of test print number to detect cyan, magenta and yellow densities of each test print. Density data which include fifteen densities, three for each print, obtained from the density measurement are stored in the memory 21. After the density measurement, an instruction is input through a key of the keyboard 40 to cause the operating unit 22 to perform the calculation of a correction coefficient K and the memory 21 to store the calculated correction coefficient K. If S and F are an exposure and a constant, respectively, the color density P of the test print is as follows:

$$K P = S + F \quad (3)$$

The differences in exposure and density of the second or No. 2 to fifth or No. 5 test prints from the first or No. 1 print are expressed as follows:

$$K(P_2-P_1) = S_2 - S_1 \quad (4)$$

$$K(P_3-P_1) = S_3 - S_1 \quad (5)$$

$$K(P_4-P_1) = S_4 - S_1 \quad (6)$$

$$K(P_5-P_1) = S_5 - S_1 \quad (7)$$

where each suffix indicates a print number and the exposure S is expressed by the following matrix:

$$S = \begin{bmatrix} Sc \\ Sm \\ Sy \end{bmatrix}$$

The equations (4) to (7) are generalized as follows:

$$K \cdot P = S \quad (8)$$

In the equation (8), the terms S and P are expressed by the following 3×4 matrices, respectively:

$$P = [P_2 - P_1, P_3 - P_1,$$

$$P_4 - P_1, P_5 - P_1] \quad (9)$$

$$S = [S_2 - S_1, S_3 - S_1,$$

$$S_4 - S_1, S_5 - S_1] \quad (10)$$

The value necessary to minimize the value of $(K P - S)^2$ can be obtained from the following equation:

$$K = S \cdot P' (P P')^{-1} \quad (11)$$

where P' is a 4×3 transposed matrix in which rows and columns for the matrix of equation P are transposed.

The correction coefficient K is obtained from the matrix (11). The operating unit 22 calculates the equations (9), (10) and (11) by use of the three color densities P for the five test prints to obtain the correction coefficient K for each color.

The printer is controlled daily to maintain an optimum exposure condition so as to make prints from the control negative with the same color balance and density as those of the reference print. Upon setting the printer to such an optimum exposure condition, after selecting an exposure condition setting mode by a selecting key of the keyboard 40, the control negative is placed in the exposure station of the printing exposure system and an exposure is made without conducting any exposure correction by means of the correction keys so as to make a test print from the control negative. The print thus made and the reference print are measured by the densitometer 10 to detect three color densities ($P_{ref}$, P) thereof. Exposure correction values B for three colors are calculated by substituting the three color densities ($P_{ref}$, P) and the correction coefficients K obtained in the standard exposure condition setting operation into the equation (1) and stored in the memory 21.

When making extra prints from a negative film provided by a customer, exposure times for three colors T are obtained by calculating the equation (2) by substituting for the exposure correction values B obtained in the exposure condition setting operation for each frame of the customer's negative. The exposure controller 32 inserts the color filters 34 to 37 into the printing path L at proper timings according to the exposure times, thereby creating a latent image in the color paper 31 so as to make prints with favorable color balance and density from the customer's negative.

In the above described embodiment, a properly exposed control negative is used to obtain exposure correction values B. However, in practice, because there may be three different control negatives (under exposed, properly exposed and overexposed), it is preferable to calculate exposure correction values B for these different control negatives and to use them selectively according to exposure conditions of each frame of the customer's negatives.

It is preferable to make five test prints and use them to establish correction coefficients K for daily maintenance. It is possible to store in and read out from the memory 21 three color densities of the reference print measured for calculating exposure correction values B for the first time in order to omit the measurement of density of the reference print in daily maintenance. It also is possible to make test prints while manually changing an exposure condition by practically operating the exposure correction keys one by one.

The light measuring unit 24, which measures negatives to detect three color densities, may be used in place of the densitometer 10. In this case, the test print or the reference print is placed in the printing exposure station. The present invention can be embodied in a photographic printer of the type having cyan, magenta and yellow filters of which the amounts of insertion into the printing light path L are controlled to make a proper exposure.

It should be noted that various changes and modifications within the scope of the invention will be apparent to those of working skill in this technical field. Such changes and modifications are intended to be covered by the following claims.

What is claimed is:

1. A method of setting exposure conditions for three colors in a photographic printer in which a difference in density between a previously provided reference print and a test print made from a control negative without exposure correction is corrected, color by color, by making an exposure which is corrected by use of an exposure correction value which is obtained, color by color, by multiplying the difference of density between the test print and the previously provided reference print by a correction coefficient, said method comprising the steps of:

making first to fifth control prints from a control negative under first to fifth different exposure conditions, corrections being effected for density in the first exposure condition, for density and all of yellow, magenta, and cyan in the second exposure condition, for density and each one of yellow, magenta and cyan in each of the third to fifth exposure conditions respectively;

measuring the first to fifth control prints to detect three color densities for each control print; and comparing three color densities of the first control prints with those of the second to fifth control prints, respectively, to detect a ratio of change of density to exposure between the first control print and each of the second to fifth control prints, so as to obtain said correction coefficient, color by color.

2. A method of setting exposure conditions for three colors in a photographic printer in which three color densities of a test print, made from a control negative without using exposure correction keys for effecting exposure correction, are made equivalent to three color densities of a previously provided reference print, respectively, by making an exposure which is corrected by an exposure correction value which is obtained, color by color, by multiplying a difference in density between the test print and the previously provided reference print by a correction coefficient, said method comprising the steps of:

making first to fifth control prints from a control negative under first to fifth different exposure conditions, exposure corrections being effected by operating a density correction key to decrease density by one step under the first exposure condition, by operating the density correction key to decrease density by one step and the color correction keys to increase color by two steps for all of yellow, magenta and cyan under the second exposure condition, by operating the density correction key to decrease density by one step and each color correction key to increase color by two steps in each of the third to fifth exposure conditions;

measuring the first to fifth control prints to detect three color densities; and comparing three color densities of the first control prints with those of the second to fifth control prints, respectively, to detect a ratio of change of density to exposure between the first control print and each of the second to fifth control prints, so as to obtain said correction coefficient, color by color.

3. A method of setting exposure conditions for three colors in a photographic printer, said method comprising the following steps:

making first to fifth control prints from a control negative under first to fifth different exposure conditions, exposure corrections being effected by operating a density correction key to decrease density by one step in the first exposure condition, by operating the density correction key to decrease density by one step and color correction keys to increase color by two steps for all of yellow, magenta and cyan in the second exposure condition, by operating the density correction key to decrease density by one step and each color correction key to increase color by two steps under each of the third to fifth exposure conditions;

measuring the first to fifth control prints to detect three color densities;

comparing three color densities of the first control print with those of the second to fifth control prints, respectively, to detect a ratio of change of density to exposure between the first control print and each of the second to fifth control prints, so as to obtain a correction coefficient, color by color; and while performing maintenance on the photographic printer, making three color densities of an extra test print made from the control negative without using the density and color correction keys equivalent to three color densities of a previously provided reference print, respectively, by making an exposure corrected by the use of an exposure correction value which is obtained, color by color, by multiplying the difference of density between the test print and the previously provided reference print by said correction coefficient.

* * * * *